United States Patent [19]

Graas et al.

[11] Patent Number: 4,492,022
[45] Date of Patent: Jan. 8, 1985

[54] APPARATUS FOR THE PAIRED CONNECTION OF SHEET PILES WITH CLAWS

[75] Inventors: René Graas, Esch; Michel Fackelstein, Niedercorn, both of Luxembourg

[73] Assignee: Arbed S.A., Luxembourg

[21] Appl. No.: 406,280

[22] Filed: Aug. 9, 1982

[30] Foreign Application Priority Data

Aug. 12, 1981 [LU] Luxembourg ............................ 83549

[51] Int. Cl.³ ........................ B23P 23/00; E02D 13/04
[52] U.S. Cl. ........................................ 29/787; 29/252
[58] Field of Search ................ 29/241, 433, 787, 790, 29/252, 244; 405/276, 281

[56] References Cited

U.S. PATENT DOCUMENTS 4,028,901 6/1977 Barber ............................ 405/281 X Primary Examiner—Howard N. Goldberg
Assistant Examiner—Timothy V. Eley
Attorney, Agent, or Firm—Fishman & Dionne

[57] ABSTRACT

Apparatus and a method are presented for the paired connection of sheet piles with claws, the piles having either Z-shaped cross-sections or U-shaped cross-sections. The machinery is divided into two general sections having a common axis. One pile to be joined is positioned in one section against a first alignment edge with a claw on the common axis, and the other pile to be joined is positioned in the second section against a second alignment edge with a claw on the common axis. The piles are then joined together to form a paired or "threaded" connection.

11 Claims, 6 Drawing Figures

APPARATUS FOR THE PAIRED CONNECTION OF SHEET PILES WITH CLAWS

BACKGROUND OF THE INVENTION

This invention relates to apparatus and method for the paired connection, sometimes referred to as "threading" of sheet piles having claws for the interconnection of the piles. More particularly, this invention relates to apparatus and method for the paired connection of sheet piles of Z-shaped or U-shaped cross-section for delivery to a construction site in connected pairs.

As is well known, Z-shaped or U-shaped sheet piles, which are individually formed, are often delivered to a construction site not only in individual pieces but in joined pairs. At the construction site the sheet piles are driven into the ground in joined pairs by means of appropriately designed pile drivers. The advantages inherent in the use of paired piles on job sites are well known.

If the advantages inherent in the use of paired piles are to be fully and economically exploited, connection of the individual piles into joined pairs must be achievable without significant difficulty. Several factors play roles in the connection of sheet piles, e.g. length of the piles, and the shape and dimensional tolerances of the claws which join the piles together. Particularly in the case of long piles, obstructions may be encountered in the process of driving or joining the piles together, often resulting in damage to the claws. The conventional approach in overcoming these obstruction difficulties is to dimension and operate the equipment used in the connection process at driving forces to overcome the obstruction by the increased application of force. This approach will often produce deformation in the claw area that becomes apparent only after completion of the connected pair of sheet piles. However, it is extremely difficult to repair damage of this type in finished paired sheet piling.

SUMMARY OF THE INVENTION

The above-discussed and other related problems of the prior art are reduced or eliminated by the apparatus and method of the present invention whereby individual piles, whether Z-shaped or U-shaped in cross-section, may be connected together in a reliable manner without the difficulties often present in the prior art.

In accordance with the present invention, pile connection machinery is established having first and second sections with a continuous longitudinal axis or plane defined through the length of two sections. The first section has a horizontal roller table for receiving a pile and a series of vertical cam shafts which define an alignment edge for the pile. The second section contains a horizontal roller table for receiving another pile, and a series of stationary vertical rollers which define a second alignment edge. The alignment edges in each secton are parallel to the common longitudinal axis. Each section also has a reciprocating ram for movement or positioning of the pile in the section. The piles are then positioned horizontally and vertically against the alignment edges and in such a way that the claws of each pile to be joined are in alignment. If the piles are Z-shaped in cross-section, pressure rollers are employed vertically against an edge of the pile to rotate or pivot the pile into proper position for joining. If U-shaped cross-sections are employed lifting rollers are used to elevate the claw edges of the piles to a predetermined axis so that the piles can be joined together. After the piles have been positioned in alignment for joining, the ram in one section is positioned to act as a stop; and the ram in the other section is activated to move the pile from that other section into the pile of the first section to join the two piles together at the claws.

BRIEF DESCRIPTION OF THE DRAWING

Referring now to the drawings, wherein like elements are numbered alike in the several figures.

DESCRIPTION OF THE PREFERRED EMBODIMENT

Figure 1:
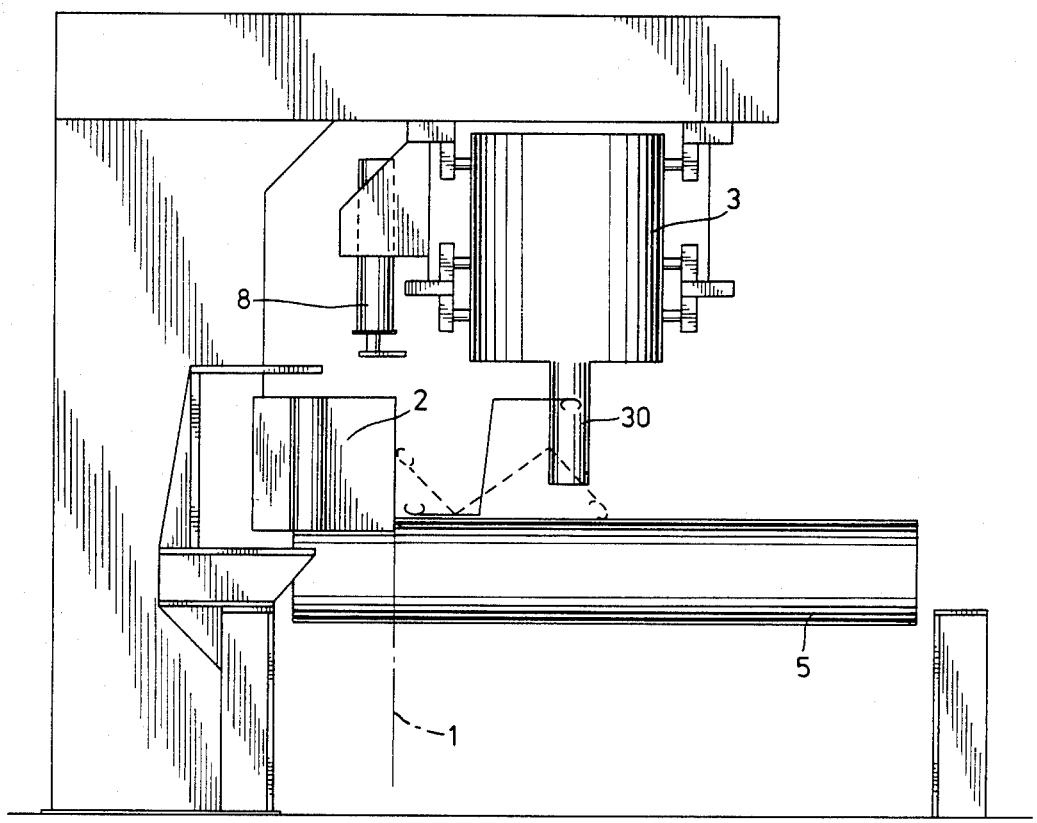
FIG. 1 shows an elevation section of the machinery of the present invention in section I, as identified in FIG. 5, of machinery for connecting pile sheets having Z-shaped cross-sections.
Figure 2:
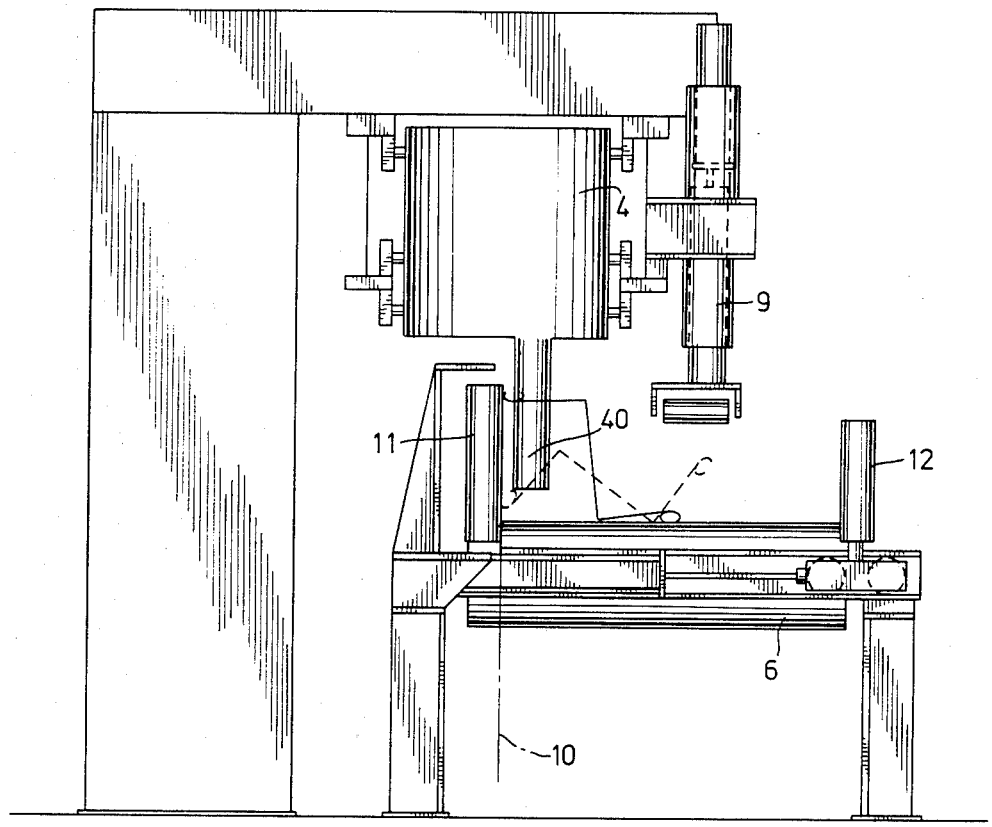
FIG. 2 shows an elevation section of the machinery of the present invention in section II, as identified in FIG. 5, of machinery for connecting pile sheets having Z-shaped cross-sections.
Figure 5:
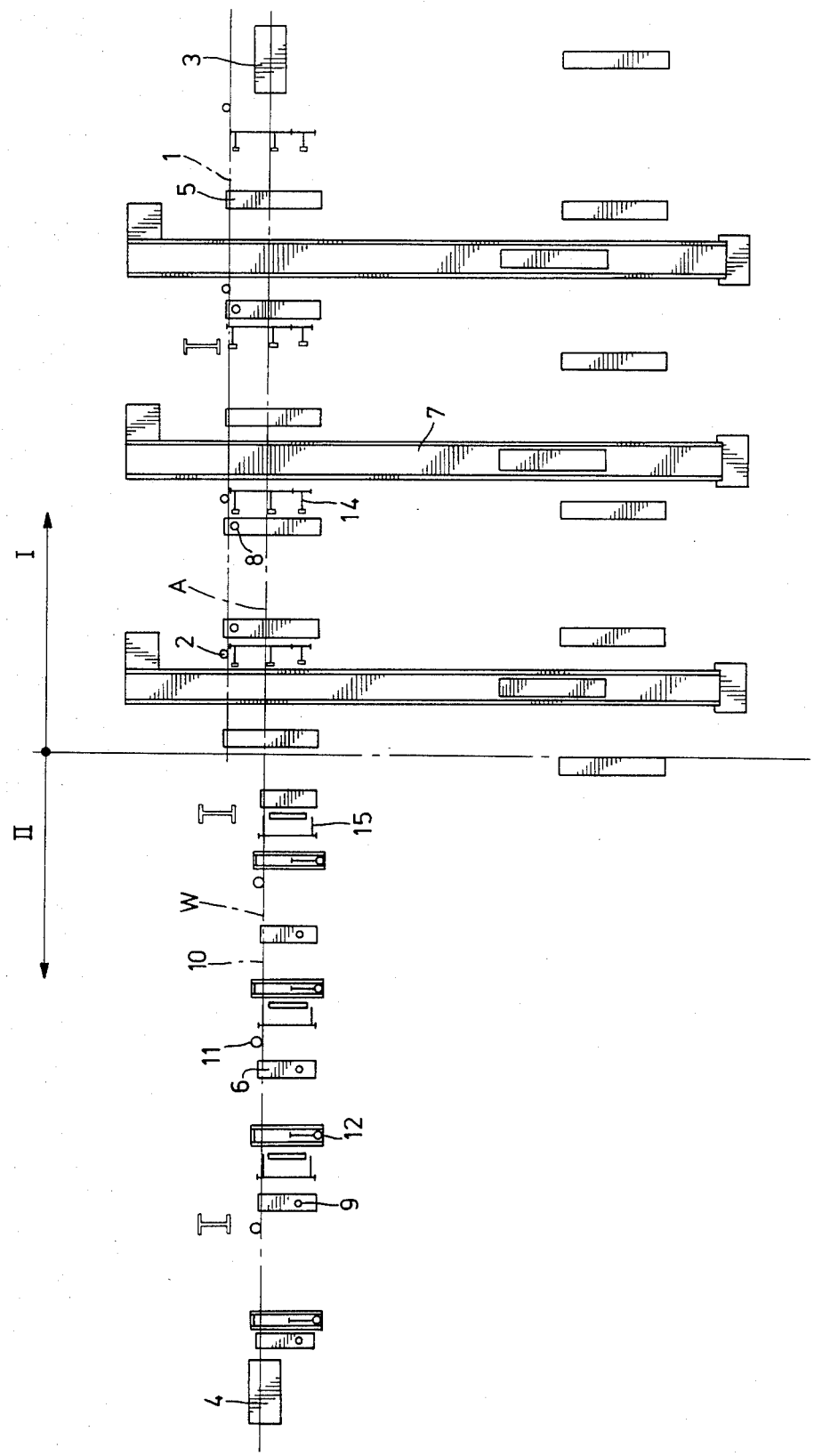
FIG. 5 is a top plan view of the machinery of the present invention.

Referring now to a joint consideration of FIGS. 1, 2 and 5, the machinery of the present invention may, for purposes of convenience of explanation, be viewed as having two sections, section I and section II (see FIG. 5). What may be referred to as a longitudinal axis or vertical plane A is defined in the equipment and extends along the entire length of the equipment. Section I has a roller table made up of a series of horizontally mounted rollers 5 which are spaced apart in the direction of axis A. Section II also has a roller table made up of a series of horizontally mounted rollers 6 spaced apart along the direction of axis A. In section I an alignment edge or plane 1 is defined by a series of vertical cam shafts 2. The cam shafts 2 are eccentrically mounted; and they may be adjusted in unison about their mounting axes to select or change the location of edge or plane 1 so that the pile claw removed from edge 1 is on axis A.

In section II, a stationary vertical alignment edge or plane 10 is defined by a series of vertically mounted rollers 11. The rollers 11 are free to rotate about their axes, but they are fixed horizontally, so that the position of alignment edge or plane 10 is fixed. Alignment edge 10 is spaced from axis A by ½ the width of the edge claw on a pile which is to be adjoined to another pile so that this claw is on axis A.

Depending on the width of the piles to be joined, cam shafts 2 are adjusted to define the location of alignment edge 1. The positions of rams 3 and 4 are then adjusted depending on the lengths of the piles to be joined. The position of ram 3 is fixed during operation of the equipment, so that the thrust arm 30 of ram 3 acts, in effect, as a limit or stop. Ram 4 will move in the direction of axis A, so that thrust arm 40 of ram 4 is active to move a pile. Thrust arm 40 may be retractable into and out of the body of ram 4 to permit maneuvering without thrust action. Rams 3 and 4 are mounted on and move on axes parallel to axis A.

The pair of piles are then fed into the machinery, one lying behind the other, over roller tables 5 and 6 up to ram 3. That is, one pile will be located in section I on roller table 5 with its right most edge (as seen in FIG. 5) against ram 3; and the other pile will be located in section II on roller table 6. When the piles of Z-shaped cross-section are first loaded into the machinery, they are in the position shown in the dashed lines in FIGS. 1 and 2 where they contact the roller table at one outer edge of an edge flange and at the junction of the web and the other outer end flange.

In the next step of the procedure, the piles are rotated to the positions shown in the solid lines in FIGS. 1 and 2. This is accomplished in section I by the combined action of a transfer skid mechanism 7 and pressure rollers 8. Transfer skid mechanism 7, which has upwardly projecting blocks, moves toward alignment edge 1 to urge the pile against alignment edge 1. The pressure rollers 8 move vertically to engage an edge of the pile to rotate the pile to an upward position. Thus, as shown in FIG. 1, the Z-shaped pile will be moved leftwardly by the skid 7 (not shown) and it will be rotated counterclockwise from the dash line position to the solid line position by the action of pressure roller 8 which move vertically downward to engage the edge of the pile and rotate it. Similarly, in section II the pile is moved leftwardly and aligned against alignment edge 10 by the combined action of adjustable vertical rollers 12 and pressure rollers 9. The vertical rollers 12 are adjustable in position to move to the left, while pressure rollers 9 move vertically to contact the edge of the pile and rotate it in a clockwise position from the dashed position to the solid line position shown in FIG. 2. In both sections I and II, the piles may be rotated and moved against the alignment edges simultaneously, or the rotation and transfer movement may be effected sequentially, as long as no interference or binding of the piles is permitted to occurr.

After the piles have been positioned as shown in the solid line positions in FIGS. 1 and 2 against their respective alignment edges 1 and 10, one claw of each pile will be in alignment with a claw of the other pile along axis A. Thus, in section I (FIG. 1) the uppermost claw, which in the geometric arrangement of FIG. 1 is the claw away from alignment edge 1, will be on axis A; and in section II (FIG. 2) the uppermost claw (which in the geometric arrangement of FIG. 2 is the claw up against the alignment edge 10) will also be on axis A and in direct and mating alignment with the claw of the pile in section I.

The claws are then threaded or joined to join the piles together by movement of ram 4 and thrust arm 40 to the right (as viewed in FIG. 5) parallel to axis A. This movement of ram 4 and thrust arm 40 moves the pile of section II to the right in mating engagement with the pile in secion I (which is held against movement by stationary ram 3 and its thrust arm 30). In this way, the piles are joined or threaded together without the problems encountered in the prior art.

Figure 3:
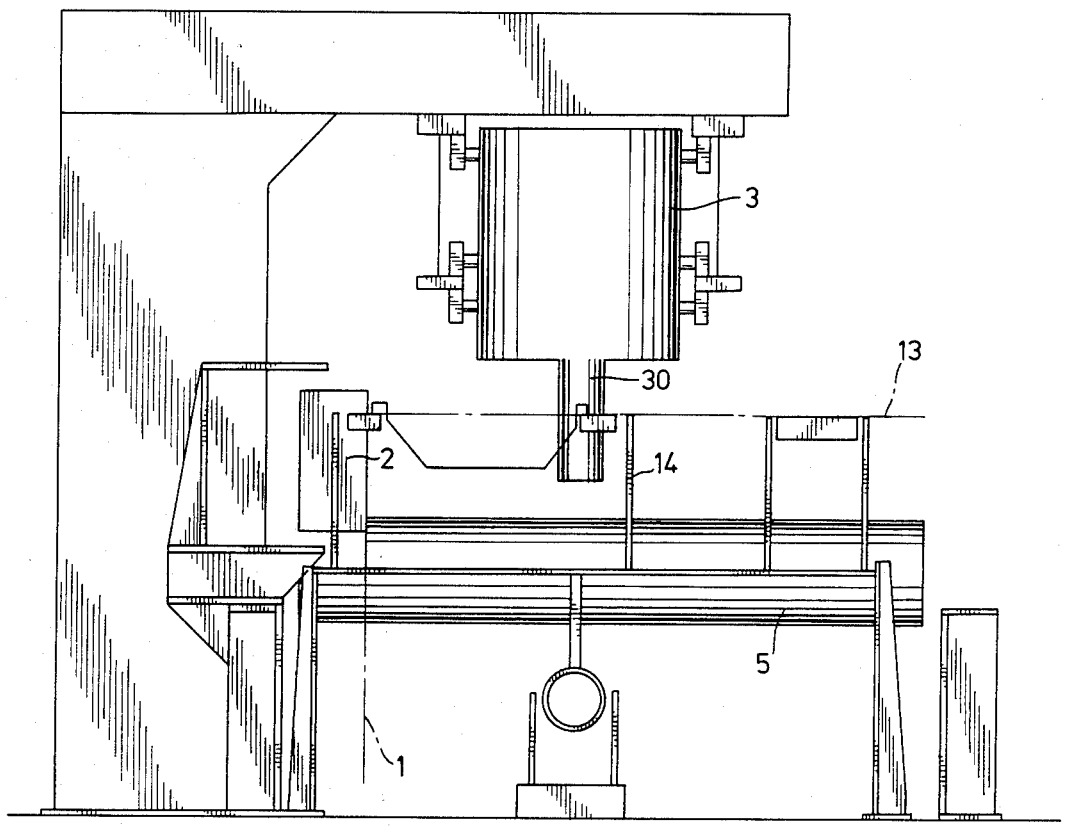
FIG. 3 shows an elevation section of the machinery of the present invention in section I, as identified in FIG. 5, of machinery for connecting pile sheets having U-shaped cross-sections.
Figure 4:
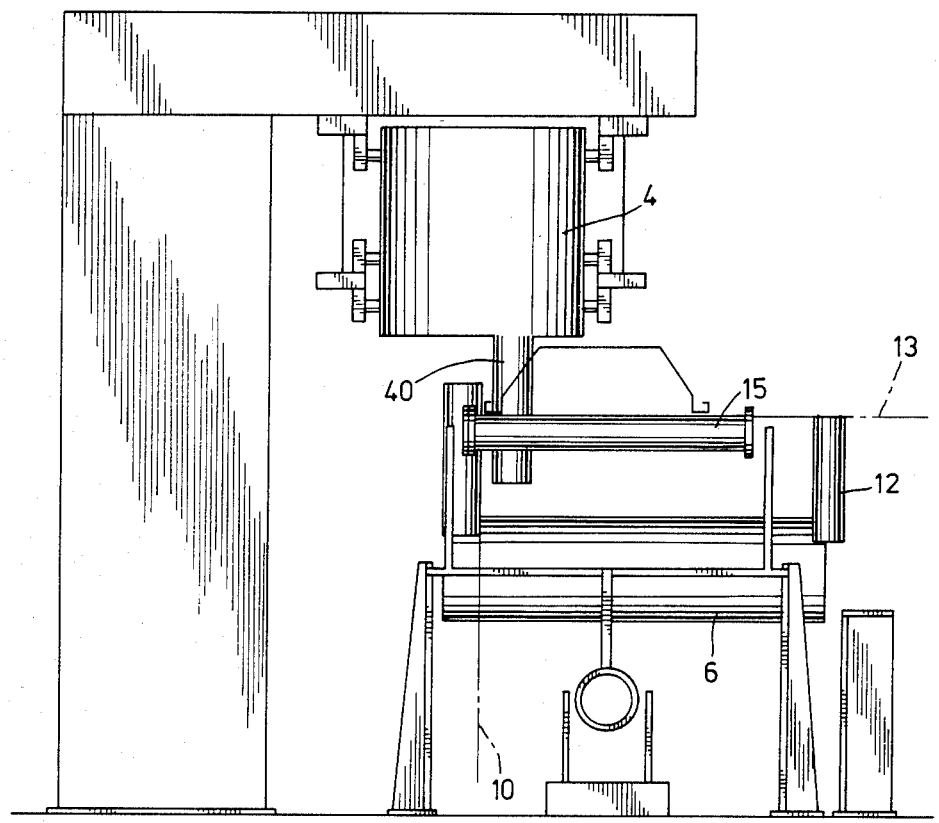
FIG. 4 shows an elevation section of the machinery of the present invention in section II, as identified in FIG. 5, of machinery for connecting pile sheets having U-shaped cross-sections.

Referring now to a joint consideration of FIGS. 3, 4 and 5, additional structural elements of the machinery are shown and described for use in joining piles of U-shaped cross-section. FIG. 3 represents section I of the equipment and FIG. 4 represents section II. The piles are fed into the equipment in the same manner as previously described, with the positions of the U-shaped cross-sections of the piles being reversed between the two sections. That is, as shown in FIGS. 3 and 4 one pile faces upwardly while the other pile faces downwardly. As with the Z-shaped configuration, the U-shaped piles are also urged against their respective alignment edges 1 and 10 by transfer skid 7 in section I and by the positioning mechanism of rollers 12 in section II. In the FIGS. 3 and 4 configuration for piles of U-shaped cross-section, a third, and vertical, alignment edge 13 is defined. Vertically adjustable rollers 14 contact the outer edges of the pile in section I and elevate the pile so that the claws are at alignment edge or plane 13. Similarly, in section II (FIG. 4) lifting rollers 15 elevate the pile so that the claws of the pile in section II are also at alignment edge or plane 13. The claw in section II which is spaced from alignment edge 1 is on axis A, and the claw in section II which is against alignment edge 10 is also on axis A. Accordingly, by movement of ram 4 and its thrust arm 40, the pile in section II is moved to the right (as viewed in FIG. 5) to join or thread the claws on axis A to form a paired connection of piles of U-shaped cross-section.

Figure 6:
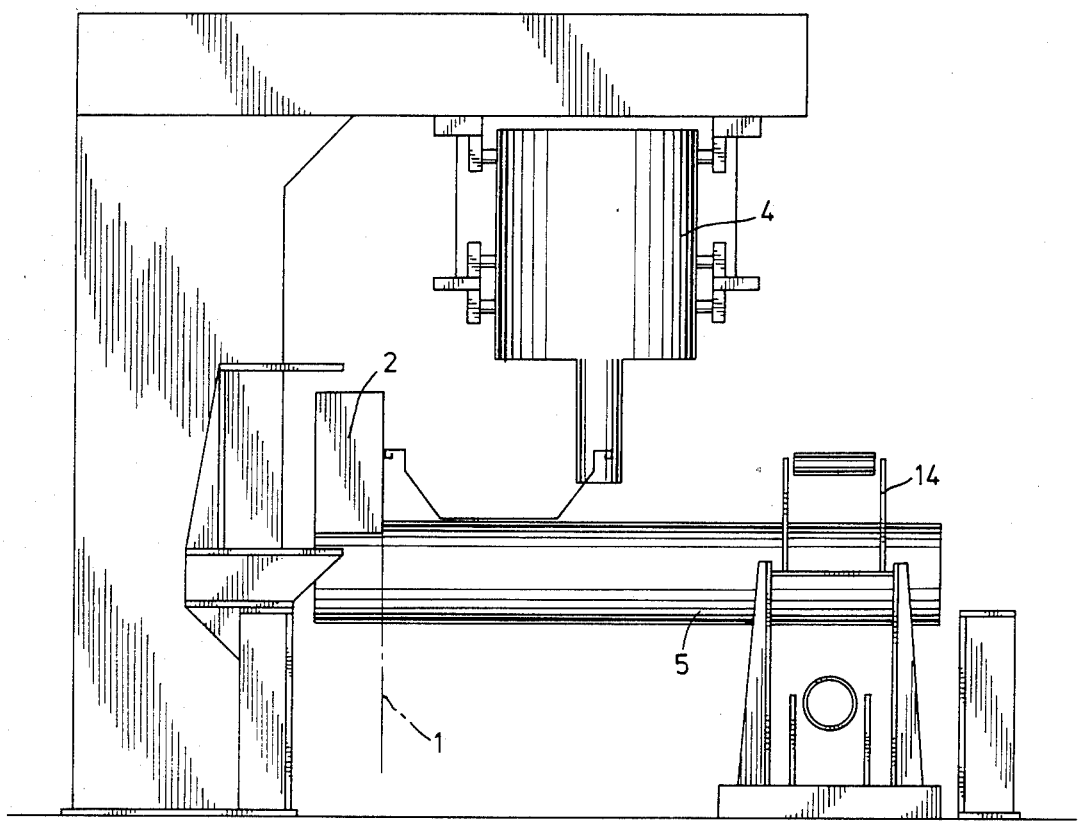
FIG. 6 is a view similar to FIG. 3 showing a modification of the machinery.

Referring to FIG. 6, a configuration is shown in which a U-shaped pile in section I remains on roller table 5, i.e., is not elevated. To complete the joining of the piles, the inverted U-shaped pile in section II would be elevated only to the height of the top of the pile in section I, and the piles would then be joined together by moving the piles from section II into the pile of section I.

It will, of course, be understood that all of the parts of the equipment will be constructed of appropriate materials, such as case hardened steel or other appropriate materials. Bearing in mind that the piles are normally relatively large elements, the various moveable components of the equipment, such as the rollers, transfer skids, positioning mechanisms and operating rams will be hydraulically powered or otherwise appropriately powered. A specific embodiment of the equipment is adapted for connecting piles of Z-shaped and U-shaped cross-sections with module widths of 500, 550, 600 and 700 millimeters and in lengths of 6 to 36 meters. The operating rams may then be equipped with automatic traverse length adjustments. Connecting speed may be adjusted continuously up to one meter per second, up to a maximum ram speed of two meters per second.

The apparatus and method of the present invention make it possible to interconnect piles in a consistent and reliable manner while eliminating many of the problems previously encountered in the prior art in pile interconnection.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. Apparatus for the paired connection of sheet piles with claws, the apparatus comprising:
   first bed means in a first section and second bed means in a second section;
   said bed means having a common longitudinal axis;
   first alignment means associaed with said first bed means for defining a first alignment edge in said first section;

second alignment means associated with said second bed means for defining a second alignment edge in said second section;

first positioning means for positioning a first pile in said first section against said first alignment edge, the pile having a first claw on said common axis;

second positioning means for positioning a second pile having an edge claw in said second section against said second alignment edge, the pile having a second claw on said common axis; and means for moving the pile in one section relative to the pile in the other section to interengage the claws of each pile on the common axis to form a joined pair of piles.

2. The apparatus of claim 1 wherein:
said first and second bed means are each horizontally mounted roller beds.

3. The apparatus of claim 1 wherein:
said first alignment means include a plurality of vertically mounted cams.

4. The apparatus of claim 3 wherein:
said second alignment means includes a plurality of vertically mounted rollers.

5. The apparatus of claim 3 wherein:
said cams are eccentrically mounted.

6. The apparatus of claim 1 wherein:
said first positioning means and said second positioning means include means for urging the pile against the first and second alignment means, respectively.

7. The apparatus of claim 6 wherein:
said first and second positioning means also includes rotating means for rotating the piles to desired positions.

8. The apparatus of claim 7 wherein:
said rotating means includes vertically adjustable pressure rollers for engaging flanges of piles of Z-shaped cross-section.

9. The apparatus of claim 6 including:
elevating means for lifting at least one pile of U-shaped cross-section to bring the pile claws into engaging alignment.

10. The apparatus of claim 1 wherein:
said moving means is mounted for movement parallel to said common axis.

11. The apparatus of claim 1 wherein:
said first and second alignment edges are parallel to said common axis.

* * * * *